(12) United States Patent
Minkin et al.

(10) Patent No.: US 6,668,071 B1
(45) Date of Patent: Dec. 23, 2003

(54) METHOD AND APPARATUS FOR USER IDENTIFICATION USING PULSATING LIGHT SOURCE

(76) Inventors: Viktor Albertovich Minkin, Novoizmailovsky pr., 75-20, St. Petersburg, 196247 (RU); Alexandr Anatolievich Grekovich, ul. Parashiutnaya, 2-1-292, St. Petersburg, 197349 (RU); Ludmila Pavlovna Romanova, pr. Shvernika, 30-21, St. Petersburg, 194021 (RU); Sergei Sergeevich Tataurschikov, ul. Aprelskava, 6-2-48, St. Petersburg, 195268 (RU); Alexandr Iliich Shtam, ul. Novosibirskava, 13-9, St. Petersburg, 197342 (RU)

( * ) Notice: Subject to any disclaimer, the term of this patent is extended or adjusted under 35 U.S.C. 154(b) by 0 days.

(21) Appl. No.: 09/334,611

(22) Filed: Jun. 17, 1999

Related U.S. Application Data

(63) Continuation-in-part of application No. PCT/RU97/00105, filed on Apr. 4, 1997.

(51) Int. Cl.[7] ................................................ G06K 9/00
(52) U.S. Cl. ...................................................... 382/124
(58) Field of Search ................. 382/115–116, 124–127; 713/182, 186; 902/3–6; 235/380, 382, 382.5; 340/5.52, 5.53, 5.83; 250/458.1

(56) References Cited

U.S. PATENT DOCUMENTS 4,786,813 A * 11/1988 Svanberg et al. ......... 250/458.1

5,230,025 A    7/1993 Fishbine et al.

FOREIGN PATENT DOCUMENTS

| DE | 4222387 | 2/1994 |
|---|---|---|
| EP | 0468522 | 1/1992 |
| FR | 2674051 | 9/1992 |
| JP | 61240383 | 10/1986 |
| JP | 62127979 | 6/1987 |
| RU | 2031625 | 3/1995 |
| WO | 9204689 | 3/1992 |
| WO | WO 92/04689 | * 3/1992 |

OTHER PUBLICATIONS

International Search Report dated Jul. 31, 1997.

* cited by examiner

*Primary Examiner*—Samir Ahmed
*Assistant Examiner*—Vikkram Bali
(74) *Attorney, Agent, or Firm*—Stevens, Davis, Miller & Mosher, LLP

(57) ABSTRACT

Pulsating light is used to penetrate a user's finger placed an input surface (which can be a fiber optic surface) of a video camera to avoid the effects of bloodflow from a normal human pulse on the quality of the image which would otherwise change the contrast of the image. The use of pulsating light of shorter durations than a typical human pulse provides an accurate image of a portion of a finger for identification. A retractable cover blocks the fiber optic input surface during a non-working mode, and allows access for identification during a working mode. A light source having a plurality of light emitting diodes provides light that diaphans a portion of the finger. Several successive frames of image signals allow for biometric detection and verification of a human pulse to ensure the finger is not a counterfeit.

20 Claims, 9 Drawing Sheets

METHOD AND APPARATUS FOR USER IDENTIFICATION USING PULSATING LIGHT SOURCE

This application is a continuation-in-part of PCT International Application PCT/RU97/0000105 with an international filing date of Apr. 4, 1997.

BACKGROUND OF THE INVENTION

1. Field of the Invention

The field of the invention relates to systems for optical identification and verification of personal identity. More particularly, this invention relates to the optical scanning of fingerprints (dactyloscopical systems) for personal identification as required in such areas as computer technology, criminology, medicine, banking, finance, security, admittance-control systems and firearm safety locks.

2. Description of the Related Art

There are several prior art optical security systems which store, process and identify fingerprint patterns by electronic devices. Optical dactyloscopical systems can be divided into two groups according to their functional capabilities: (1) systems that read fingerprint images from intermediate data storage units, such as, for example, traditional dactyloscopical cards (fingerprint cards) and utilize various types of tables to classify the fingerprints (see MORPHO Systems leaflet of 1992); and (2) systems obtaining dactyloscopical information directly from the finger, i.e. the so-called "live scanners."

These two groups differ greatly from each other. First, the surface texture of data storage units, which can be dactyloscopical cards or dermal ridge patterns of a fingertip, may differ. The area of application constitutes the second major difference between the two groups.

Systems of the first group are used mainly by police and criminologists for the purposes of personal identification of criminals. Dactyloscopical cards are used along with the tracks collected at a crime site. However, these systems are not suitable for immediate identity verification. Regular scanners such as designed by Morpho Systems, are currently used to read such dactocards and tracks (see MORPHO Systems leaflet of 1992). However, these types of systems cannot process information available from dermal ridge patterns of a live fingertip.

Moreover, the use of fingerprint cards causes a considerable loss of information because registration and processing of each and every small detail of dermal relief is limited.

Systems of the second group, which process optical dactyloscopical information obtained from a "live" finger, may be subdivided into the following categories:

Category 1—Systems operating in reflected light; and

Category 2—Systems operating in penetrating light.

This subdivision is based on the functional principles of the system at the initial stage of transformation of the dactyloscopical image. For example, over the last ten years, systems such as one designed by Digital Biometrics utilizes miniature cameras and charge transfer devices (CCDs) to detect the reflected part of light from a finger surface.

These reflection-type operating systems take advantage of the effects associated with the complete inner reflection of the light, i.e., light that is reflected just from those places of the prism surface at which the dermal ridges of a finger directly contact the prism surface.

The dactyloscopical camera uses a series of lenses to fix the reflected image of the dermal pattern. Such reflection systems have many advantages over systems utilizing dactocards. Reflection systems allow for quick scanning and processing of information, and a user's fingers are not soiled from ink or ultraviolet-type stamping. However, these reflection systems also have some disadvantages due to their mode of operation. Some of these disadvantages are discussed below.

One disadvantage is that when a scanned finger is dry, the picture quality is reduced. This reduced quality results in a low probability of identification. The reason that a dry finger creates a problem is that when it touches the contact surface, the contact area is very small, making it impossible to produce a high-quality image. It has been proven that inaccuracy of at least one micron leads to a complete loss of dactyloscopical information. Such reflection systems attempt to compensate for this disadvantage by coating the contact surface with special contact substances, as disclosed in European Patent Application No. 304092, published Feb. 22, 1989. Another problem is that the low mechanical resistance of contact surface coatings causes the coating to come off after contact with several fingers.

Another disadvantage of using a series of lenses is that it principally leads to a significant drop in quality because of optical distortions and aberrations introduced by the lenses. Moreover, for each additional element introduced into the process of data transfer, additional errors are introduced. The use of a series of lenses enlarges the size of the device and decreases the mechanical stability and reliability. There have been attempts to seal hermetically the gaps between the lenses and the contact surface, especially to prevent loose particles from entering the gaps.

The above-mentioned disadvantages prevent widespread use of such reflection systems, allowing only for their occasional use in instances when neither the high security of automatic identification, nor the small dimensions of the device are prohibitive.

Russian Patent No. 2031625, published Mar. 27, 1995 discloses a light penetrating system and user identity verification method. In this system, a user's finger must be placed on a fiber optical surface of camera, and then, penetrating directed at the finger. The output signal of the camera is computer processed, and thus the fingerprint is verified. When a finger comes into contact with an optical fiber, the dermal ridges fit closely with the fiber contact surface, and the light diaphaning the finger meets the contact surface and thus the photosensitive elements. The light lost and are much less at areas where the finger contact is direct, as opposed to areas where the relief structure does not allow direct contact.

The method disclosed in Russian Patent No. 2031625 generally is free from the types of disadvantages which are natural to light reflecting systems of image processing. The method disclosed by that Russian patent distinguishes over light reflecting systems by providing a better quality fingerprint image. The presentable gradations of dactyloscopical pictures depend only on the dynamic characteristics of the camera used. Additionally, the existence of gaps between the skin and a contact surface does not result in a complete loss of the information. Further, the size of this gap is proportional to the amount of penetrating light.

However, the light penetrating system also suffers from certain disadvantages. The present inventors have discovered that there are undesirable variations in the contrast of the dactyloscopical picture at the entry surface of the camera. These undesirable variations are caused by the user's pulse, which provides variations in the bloodflow that affect the amount of light passing through the finger. Such instability of the image results in false pieces of information that decrease the quality of the image and increase the error rate.

Another disadvantage of the light penetrating system is the dependency of picture quality on the availability of outside natural light. Moreover, this prior art system does not distinguish between a live finger and a previously recorded fingerprint. Thus, the prior art light penetrating system is vulnerable to breach by a counterfeit image, making the system undesirable for use in code-locks and other security or access control systems.

Russian Patent No. 2031623 discloses a user identity verification system based on a camera with a fiber optical entry surface designed for finger contact. The finger placed on the entry area is diaphaned by a source of light or daylight, e.g. a liet bulb, which is installed opposite the contact surface. The camera is connected with a signal processing module.

Unlike the first type of light penetrating system, a device utilizing a fiber optical entry surface does not have any. lenses; therefore, it is free from all of the inaccuracies affecting identification introduced by aberrations of the optical lenses. Such devices are characterized by small dimensions, compactness, high reliability and an uncomplicated structure. As photosensitive units, they utilize charge transfer devices (e.g. CCD/chips) which are called Frame Transfer CCD (FTCCD). FT CCDs are configured separately. One-half of the FT CCD (the image section) is engaged in transformation of the light into an image by transforming light into charge quantity equivalents. The other half is used for storage and read out of the information (picture storage section). While the next image is being generated in the image creating section, the picture, storage section stores and reads out the previous image. Thus, in CCDs, the process of image creation and reading out takes place simultaneously.

The use of such CCDs guarantees high quality images. There are other types of two-section CCDs which are known to use different elements for creating the pictures and reading out the charge. One example employs elements scanning charge transfer image in lines (Interline Transfer CCD).

Devices using fiber optics for direct transmission of the image (without scale adaptation) are suitable for only rather small skin areas, and thus are insufficient for automatic identity verification. Tests have proved that for dactyloscopical identification, the fingerprint area has to be at least 16 mm in diagonal. Meanwhile, criminology standards in different countries usually require a diagonal of 24 mm for fingerprint analysis. However, the engineering of photosensitive units with a diagonal of 16–24 mm, in addition to using fiber optic entry and charge transfer devices for the complete image, encounters technically difficult problems at the present time.

There are fiber optical units with diameter adaptation, such as disclosed by Hamamatsu, which utilizes a fiber optical taper that allows for image enlargement. Such systems may be used as fiber optical lighting conductors in dactyloscopic devices. However, devices of this type cannot have a compact design. Moreover, the maximum resolution decreases to approximately five lines per millimeter, consequently raising the probability of fingerprint misidentification. Therefore, these devices are not suitable for practical use.

The above-described disadvantages of the prior art optical scanning identification devices and methods cause such devices and methods to be significantly limited in their potential use in automatic dactyloscopical identification processes due to a high probability of error, in a field where errors are critical. The disclosure of each of the above-cited references is incorporated by reference herein in its entirety.

SUMMARY OF THE INVENTION

An object of the present invention is to provide both a method and a device for a light penetrating system for user identification purposes which results in a reduction of the quality dependency of a fingerprint image from impairment by blood flow inside the finger and by outside natural light conditions. Improving the quality and informative value of the image causes a corresponding increase for more accurate identification. The probability of rate identification of errors is improved significantly.

The present inventors have discovered that diaphaning a finger with pulsating light leads to a considerable reduction of irregularity, instability and smearing or blurring of the output images and, consequently, of a video signal. This effect takes place due to the short pulses (approximately one ms). The negative effect of blood flow on the instability of the image of a finger becomes negligible. In addition, a reduction of the picture formation time period leads to a reduction of the negative influences of varying natural lighting conditions on the dactyloscopic picture of the dermal pattern as well. Thus, use of the pulsating light according to the present invention permits clean and sharply defined pictures, in contrast to the series of sometimes blurred pictures produced by the prior art system disclosed in Russian Patent No. 2031625. This improvement of the picture quality reduces the probability rate of identification errors.

In one embodiment of the present invention, a method for user identification by penetrating light comprises the steps of (a) placing a user's finger on the fiber-optic entry surface of a video camera; (b) diaphaning the user's finger with penetrating light; (c) generating a finger image signal by the video camera; and (d) processing an image signal transmitted from the video camera, where the finger is diaphaned by pulsating light as the video camera accumulates the image of a fingerprint in a picture formation mode.

Another embodiment of the present invention provides that before the placing of the user's finger into the fiber optic input surface of the video camera, the user opens an access to the fiber optic surface and after identification, closes the access to the fiber optic input surface.

During the process of identification (i.e. when a user puts his finger on the entry surface of the camera), the finger is diaphaned by pulsating light, while the video camera is in the picture formation mode.

In another embodiment of the present invention, a video camera creates a sequence of pictures within a certain period of time. While processing these pictures, a signal-mean-value can be determined for each picture, or portions of the pictures may be selected. Thus, a time dependent sequence of signal-mean-values is determined and used as a criterion for user identification purposes.

In another embodiment of the present invention, an apparatus for user identification comprises a video camera with an optical input surface, the video camera including a photosensitive charge transfer device and a photosensitive device control module; a light source for outputting light for penetrating a section of the user's finger; and a processing module that receives an output image from the video camera, where the light source is a pulsating light emitter which is synchronized with the photosensitive device control module for pulsating switching of the pulsating light emitter while the video camera is in an image accumulation mode and the photosensitive charge transfer device is one of a Full Frame CCD or a CMOS image sensor.

In another embodiment, the light penetrating identification device may comprise a photosensitive charge transfer device that is a CMOS image sensor with a full-frame electronic shutter as the photosensitive charge transfer device.

A Full Frame shutter permits switching to the CMOS image sensor in a flash and synchronizes with the pulse light source from the image accumulation mode into a storage and reading mode. This is necessary for receiving the fingerprint image during the pulse time without smearing or blurring.

In another embodiment, the light penetrating identification device may further comprise a controlling light driver connected between the photosensitive device control module and the pulsating light emitter. The light penetrating identification device may further comprise a cover as part of the light source, which covers the fiber optic input surface when the device is in a non-working mode, and uncovers the fiber optic input surface when the device is in a working mode. The light penetrating identification device may open the cover at an angle between 10 and 90 degrees from the fiber optic surface of the photosensitive device, when the device is in a working mode. In another embodiment the light source may comprise lighting elements placed along the finger of the user. The light source may comprise at least one pulsating light emitter, for example comprising light emitting diodes mounted, for example, onto the cover at a side that faces the photosensitive device.

The cover may be constructed for even reflection of light from the pulsating light emitter to the finger of a user. The light source may comprise at least one pulsating light emitter mounted onto the cover at a side which faces the photosensitive device, wherein the side of the cover is a mirror and the pulsating light emitter is located at a same plate with the photosensitive device.

In another embodiment, the light penetrating identification device may comprise a locking mechanism for securing and transforming the cover of the light source from a closed mode to an open mode. The cover may be made of a light non-transparent material and the design of the cover shields the fiber optic input surface of the camera from external lighting.

In another embodiment, the photosensitive unit is designed as a Full Frame CCD. The term Full Frame CCD means that the photosensitive unit does not have a special light-protected storage section. The picture-formation and the reading-out of the image are separate in time, not in space, as in Frame Transfer CCDs. Such devices are prevalent in the field of television engineering. In the Full Frame CCD, the procedures of picture formation and read out are just spatially separated, not temporally (in contrast to Frame Transfer CCDs).

The Full Frame CCD can be produced much cheaper and easier than the Frame Transfer CCD because it needs only half of the components (having the same dimensions of the photosensitive unit). Of course, the Full Frame CCD can not be exposed to permanent lighting through the object, because then the formation and read out of the pictures take place simultaneously, leading to an overlap of the pictures. The present invention solves this problem as follows. The devices are equipped additionally with a synchronized emitter to control the pulses of the lighting element. This emitter is installed between the lighting element and the control module of the photosensitive unit.

The processing of several consecutive pictures allows for an increase in the informative value of the dactyloscopical pictures, since further biometric data of the user is obtained (i.e., special features of pulse). This enhances the quality of the identity verification process. The use of a pulsating light emitter allows not only a far better quality of the dactyloscopical picture (as mentioned above), but also allows for the use of Full Frame CCDs as photosensitive units. Full Frame CCDs provide high quality pictures of larger areas. The enlargement of the area in focus along with the improved stability of the image leads to a further reduction of the error rate in the process of identification. The manufacture of Full Frame CCDs with a photosensitive area of 16–24 mm diagonal plus the fiber optical entry is an easy technical task, making the device relatively easy and cheap to produce. Further, Full Frame CCD devices distort less information, as compared to devices utilizing other methods of charge shifting.

As noted above, Full frame CCDs may not be used in devices working in permanent lighting, because the formation and read out of the pictures take place simultaneously leading to an overlap of the pictures. As a result, it is impossible to gain clear pictures. Thus, the present invention allows for high-quality pictures of fingerprints as an essential precondition of automatic identity verification, with a low error probability.

In another embodiment, the cover is a narrow bandpass optic filter which allows entry of light only from the light source. This filter can be situated in different places, for example, on a CCD or in a back side of a fiber optic plate. The filter function is analogical to the previous cover, because it protects from outside light and passes only light from the light source.

DETAILED DESCRIPTION OF THE INVENTION

The embodiments discussed herein are merely illustrative examples of the present invention, and should not be interpreted as limiting the scope of the appended claims.

Figure 2:
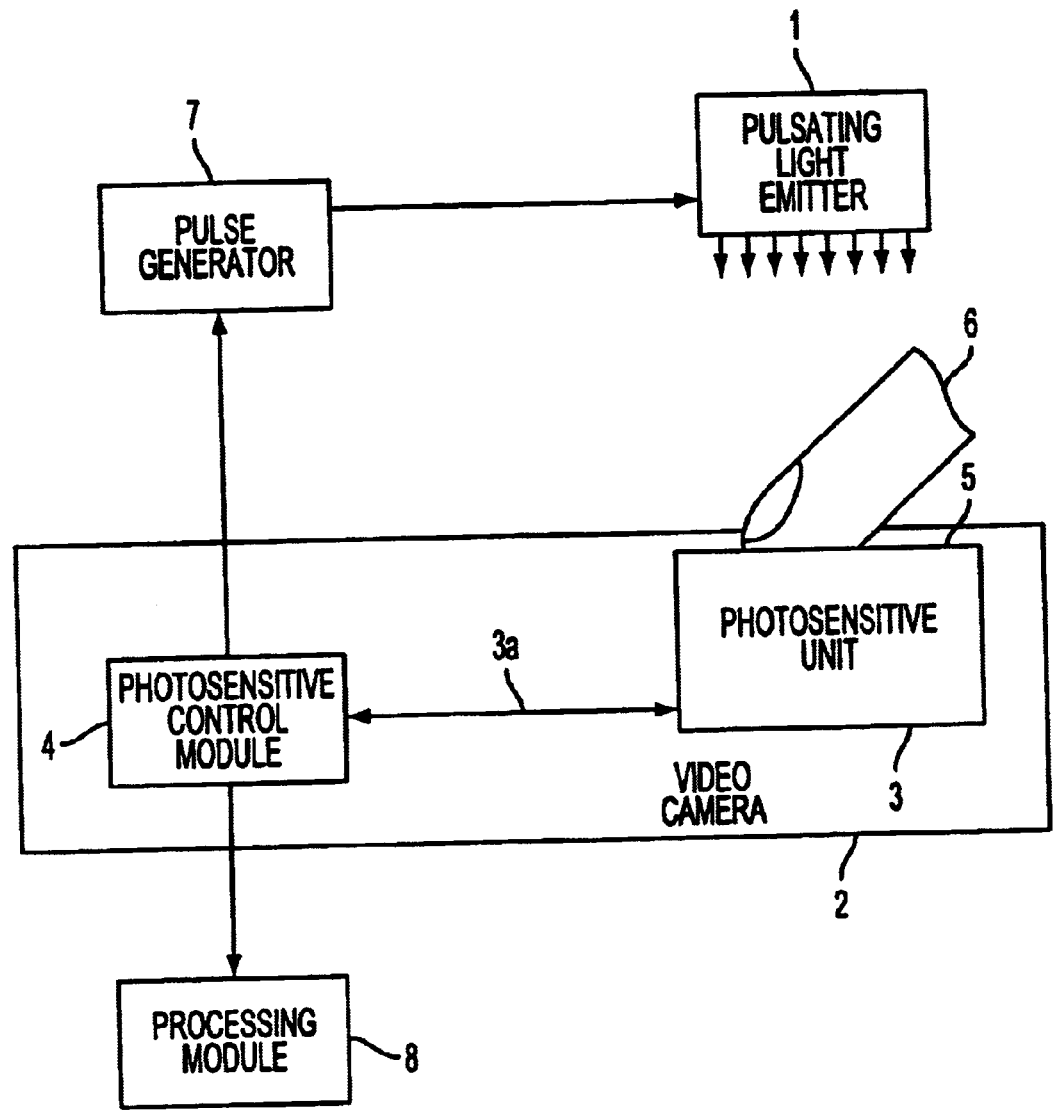
FIG. 2 is a block diagram showing the structure of the light penetrating identification device according to the present invention.

First, a brief description of the structure shown in FIG. 2 will be provided. The user verification device comprises a pulsating light emitter 1 and a video camera 2, which includes the photosensitive unit 3 (for example, a CCD) and a photosensitive control module 4 to control the photosensitive unit 3. The video camera 2 has a fiber optic entry surface 5 for the user's finger 6 to be placed thereon. The pulse generator 7 controls pulsating light emitter 1. Processing module 8, is connected to control module 4 and performs information processing.

The pulsating light emitter 1 has three diodes which emit red light in the visible range of the spectrum (about 800 nm). The light wave of the LED may be any wavelength within a spectral range of photosensitive devices (from 400 nm to 1100 nm), but a wavelength of 800 nm has certain advantages over others.

First, 800 nm is nearest the maximum for sensitivity of CCDs, CMOS devices and light emission for LEDs.

Second, a pulsating light which operates lower in the visible range (400–800 nm) can be ergonomically less desirable because low light pulses are not good for human eyes.

The number of diodes is not critical; it is possible for the emitter to comprise fewer or more than three diodes. The pulsating light emitter 1 is located opposite the entry surface 5 while being spaced at a distance from surface 5 that provides sufficient space for a user to place a finger on the entry surface 5 of the video camera 2, while being sufficiently close to allow transillumination of the finger.

Video camera 2 may be, for example, an ordinary television camera with external synchronization and a photosensitive unit 3.

The fiber optic entry surface 5 includes a fiber optical plate. The diameter of a single fiber amounts to about 10 $\mu$m and shows a numerical aperture of at least 1.0 at a wavelength of 800 nm.

According to an embodiment of the present invention, the photosensitive unit 3 is designed as a Full Frame CCD. For example, a device will work for these purposes and besides photosensitive unit 3 contains two separately controlled equal parts—each half having 288 lines of photosensitive elements. Both halves are open to light and have a mutual electronic control system (i.e., photosensitive control module 4 in FIG. 2). Each line in both the equal parts includes 512 photosensitive elements. Every element of the photosensitive section has a size of about 18×24 $\mu$m².

The charge shift process is controlled by a tri-phase control system within the photosensitive sections and its readout register. The photosensitive control module 4 is connected to the photosensitive unit 3 by a link 3 a therebetween. The photosensitive control module 4 is designed to read out the accumulated charge from photosensitive unit 3 and to transform it into a standard video signal. To enable control module 4 to generate a standard video signal, module 4 includes a built-in generator (not shown) for producing picture synchronization signals. The generator output is also one of the outputs of the camera 2 and is connected to the input of the pulse generator 7.

Pulse generator 7 generates the switch-on pulses for the pulsating light emitter 1 in response to the picture-sync-signals produced by control module 4. There are two possibilities: (1) the pulse generator 7 either just amplifies the picture-sync-signals or (2) the pulse generator 7 generates short-lasting pulses of a defined amplitude and a defined related shift relative to the picture-sync-signals. The output of pulse generator 7 is connected to the diodes of the pulsating light emitter 1 for synchronization.

If the video camera 2 creates picture-sync-signals with amplitudes sufficient to activate the light emitting diodes of pulsating light emitter 1, the pulse generator 7 may be eliminated. In such a case, the output of the picture-sync-signal generator of control module 4 may be provided directly to pulsating light emitter 1. It is possible to synchronize the video camera 2 and the pulsating light emitter 1 via an exterial sync-signal-source or by utilizing an alternating current as a pulse.

The second output of video camera 2 is connected to the input of information processing module 8. Processing module 8 can be, for example, a multimedia personal computer (PC) containing a video blaster card (for example, SE 100 of Creative Labs) to receive and process the outgoing video signal from video camera 2. Well-known dactyloscopical identification software systems are pre-installed in processing module 8.

Furthermore, additional well-known programs can be installed in processing module 8 to prevent unauthorized access to the computer or to determine the user's pulse. All functions mentioned above are carried out by the program PCLOCK distributed by the Belorussian company OPAK.

The pulsating light emitter 1, the video camera 2, and the pulse generator 7 may be designed as one single block (as a dactyloscope) which can be controlled by a personal computer (i. e. information processing module 8). At the present time, a type of dactyloscope "DELSY" is produced by the Russian Company ELSYS.

Figure 4A:
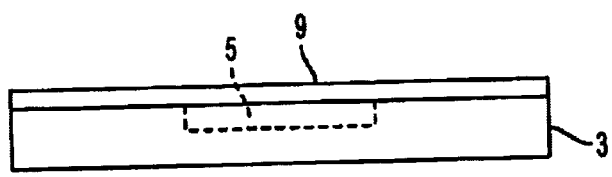
FIGS. 4A through 4C are front views of the cover being closed, open at a 90 degree angle, and open at an acute angle, respectively, with FIGS. 4B and 4C showing two alternative embodiments for diaphaning a finger.
Figure 4B:
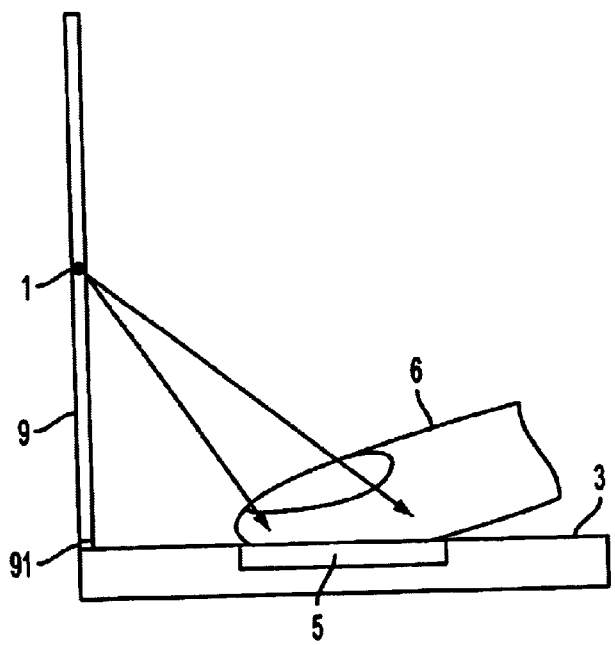
Figure 4C:
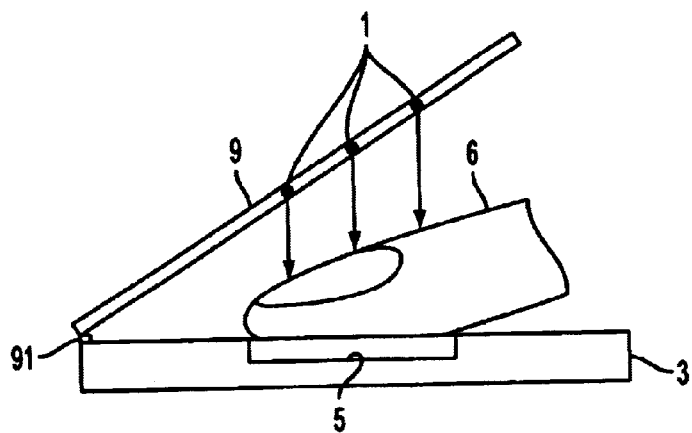

As shown in FIG. 4A, cover 9 blocks the fiber optic input surface 5 of the photosensitive unit 3. FIGS. 4B and 4C show cover 9 open so that it is perpendicular or at an angle to the fiber optic input surface 5.

FIGS. 4B and 4C also show two different embodiments of how the pulsated light emitter 1 may be attached within cover 9. In the embodiment shown in FIG. 4B, the pulsating light is directed at a downward angle toward the fiber optic surface 5 to diaphan finger 6. In the embodiment shown in FIG. 4C, the pulsating light emitter 1 is positioned so the light impinges perpendicular to the entry surface 5 when the unit is fully opened. FIGS. 4B and 4 C show cover 9 as connected to photosensitive unit 3, for example, by a hinge 91, to allow an opening at an angle ranging from at least 10° to 90° from the entry surface 5. It is possible for electrical or magnetic means to be used to hold the cover open. This degree of opening should be more than sufficient to permit a user to place a finger onto the entry surface 5 for transillumination.

Figure 5A:
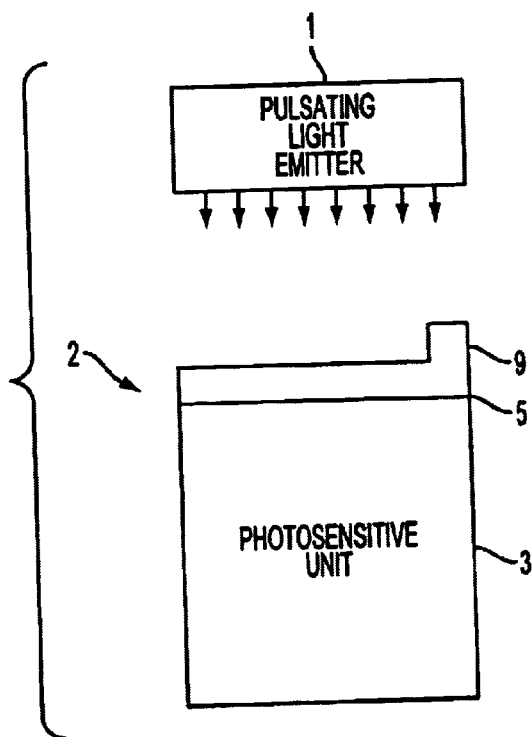
FIGS. 5A and 5B show an embodiment having a slidable type cover.
Figure 5B:
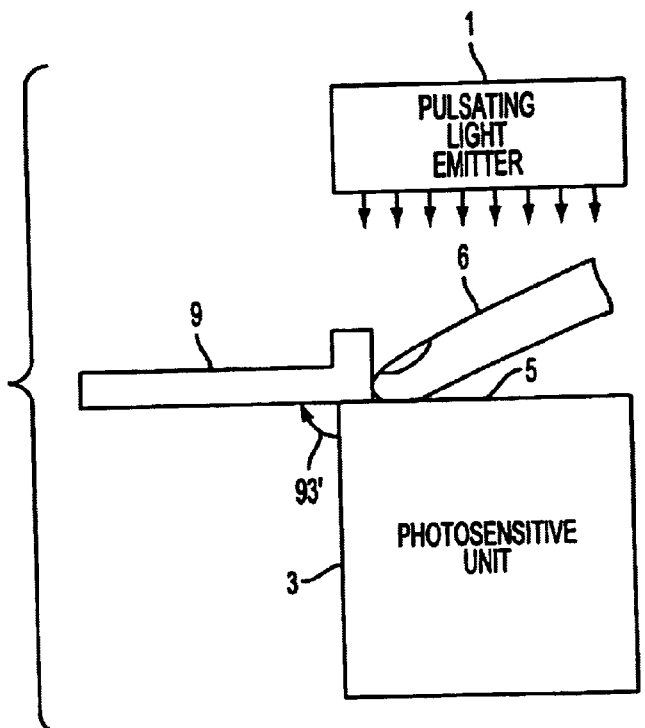

In the embodiment of FIGS. 5A and 5B, cover 9 is a connected to the photosensitive unit 3 by a slidable connection (e.g., a tongue-and-groove arrangement) which employs a biasing unit 93 (such as a spring), wherein the user pushes back an edge of a cover with a finger and the biasing unit returns cover 9 to the closed position when the finger is removed. As shown in FIG. 5B, the cover is pushed back and the user's finger passes over the fiber optic input surface until the cover is retracted to a maximum position which enables positioning of the user's finger for transillumination. After the finger has been read, the user withdraws his finger, and the biasing unit 93, which may be a spring or spring-type latch, pushes the cover back to block access to the entry surface.

Figure 6A:
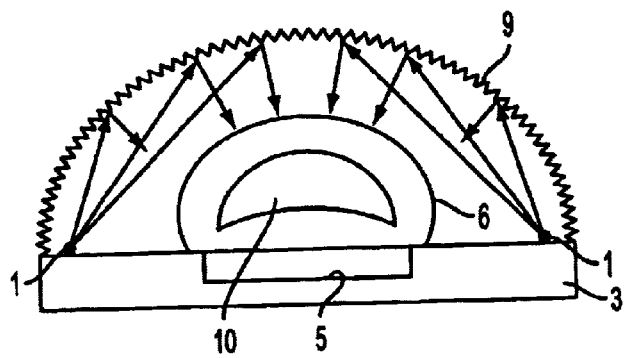
FIGS. 6A and 6B show two embodiments for diaphaning a finger with reflected light.
Figure 6B:
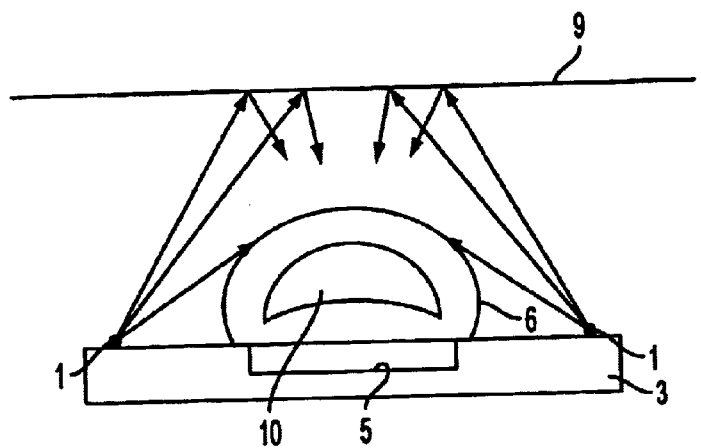

FIG. 6A shows an alternate embodiment. In FIG. 6A, photosensitive unit 3 has an entry surface 5 and one or more pulsating light emitters 1 positioned on the photosensitive unit 3 as shown. A cover 9 (which may be stationary) has a reflective inner surface for reflecting light from emitters 1 onto entry surface 5 after passing through a finger 6, having finger nail 10. In operation, the light does not directly impinge on surface 5 (and finger 6) from the pulsating light emitter 1. Instead, the light is reflected off the surface of cover 9, which is made of, or coated with, a reflective material. Light passes through finger 6 to illuminate the fiber optic surface 5. The angle of the pulsating light emitter 1 must be positioned to provide reflection that illuminates the fiber optic surface 5 and the finger 6 so that a suitable reading may occur. FIG. 6B shows a variation of the FIG. 6A embodiment.

Figure 6C:
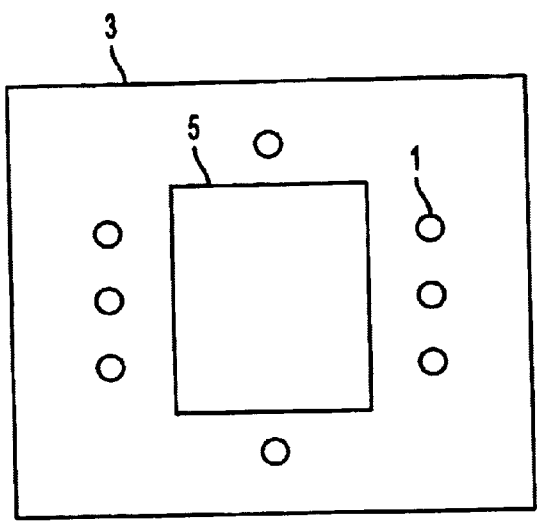
FIG. 6C shows an embodiment of placing light emitting diodes around the fiber optic surface.
Figure 7:
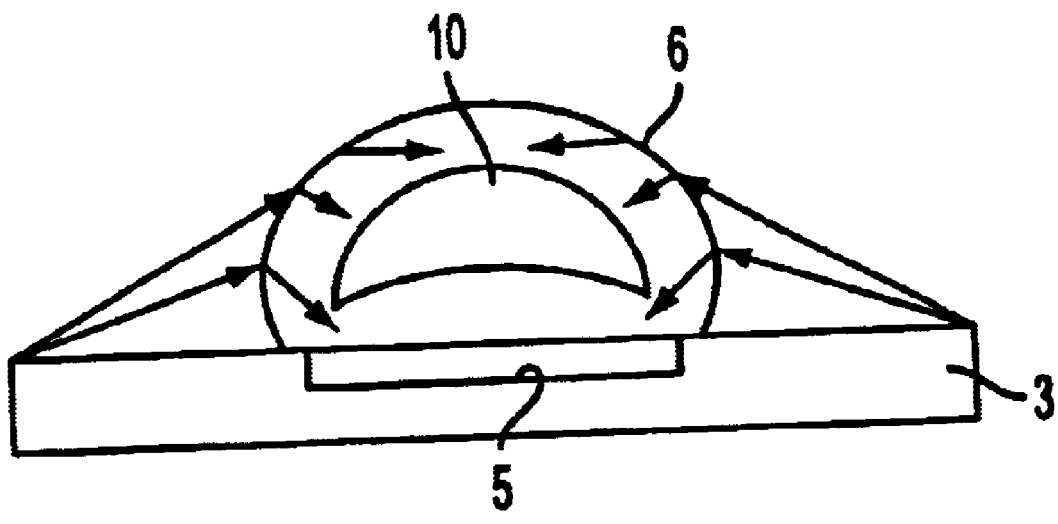
FIG. 7 is an embodiment in which a finger refracts light toward the fiber optic surface.

FIG. 6C shows one example of how pulsating light emitters 1 may be positioned around the fiber optic entry surface 5 for reflection off the cover 9, or for illuminating finger 6 according to the embodiment shown in FIG. 7.

FIG. 7 shows finger 6 placed over fiber optic surface 5. The pulsating light is refracted when passing through the finger 6 in a downward direction to diaphan a finger without reflecting off of the cover.

Figure 8:
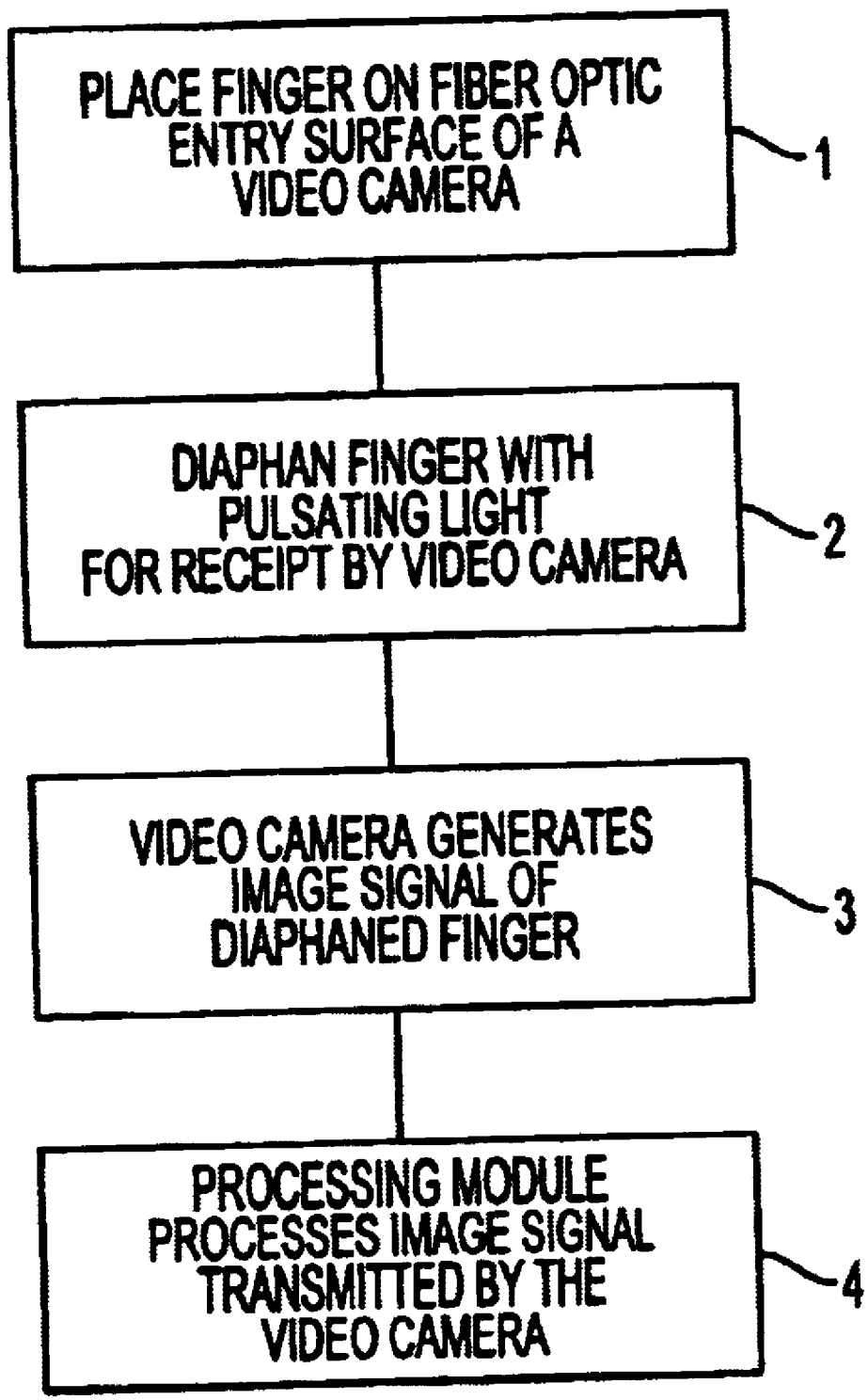
FIG. 8 is a flowchart of the basic identification method steps.

In operation, each of the above-described embodiments involves placing a user's finger 6 upon the surface of the entry surface 5 of the photosensitive unit (see FIG. 8, Step 1). While the video camera 2 is in the image formation mode, the finger 6 is diaphaned by pulsating light (see FIG. 8, Step 2) of a split second from the opposite side of the entry surface 5. The period of each light pulse does not last longer than the return trace period of the picture and amounts to about 1 ms, assuming the picture return trace period takes 1.6 ms. Upon penetrating the finger, the light enters the optical fibers at points where the dermal ridges of the finger are in direct contact with the entry surface 5 of the photosensitive unit 3 of camera 2. In a picture formation mode, the video camera 2 accumulates the image from the surface of the photosensitive unit 3, so that a pattern of charge is accumulated which reflects the image of the fingerprint (see FIG. 8, Step 3). Then, during the direct trace period (i.e. while video camera 2 is in the reading mode), the accumulated image is transformed into video signals. Subsequently, a standard video signal is processed (see FIG. 8, Step 4 ) and the user identification is completed. Processing is conducted through conversion of a video signal into sequences of digital signals employing well-known methods. The dactyloscopical information gained through this operation is handed over to the computer and then is subjected to the computer program analysis in information processing module 8 to verify the identity of the user.

Figure 9:
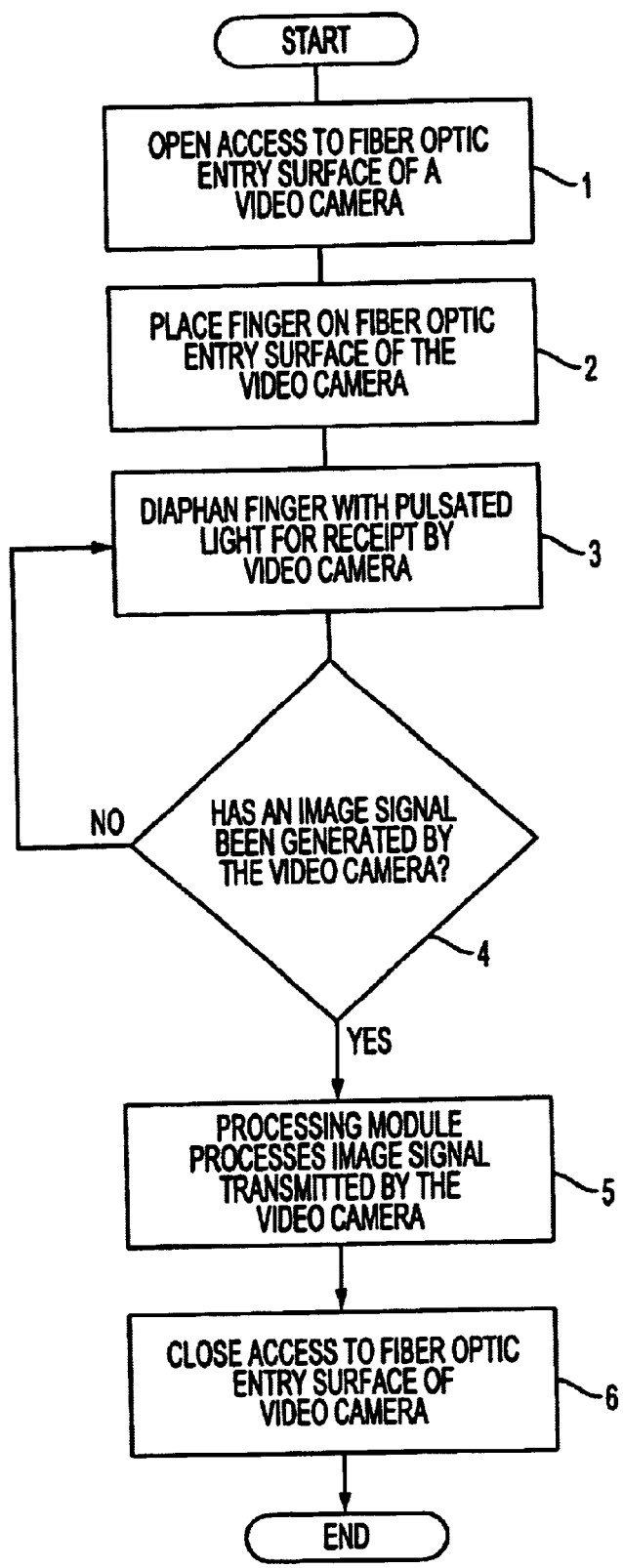
FIG. 9 is a flowchart of the identification method steps when a cover restricts access to the fiber optic entry surface.

In the embodiments in which a cover restricts the entry surface, the method of identification must first include opening access to the entry surface 5 (see FIG. 9, Step 1). After placing the user's finger on the entry surface 5 (see FIG. 9, Step 2) the finger is subsequently diaphaned with penetrating light (see FIG. 9, Step 3). If an image signal has been generated by the video camera 2 (see FIG. 9, Step 4), the processing module 8 processes the image signal (see FIG. 9, Step 5), and the access to the entry surface 5 is closed (see FIG. 9, Step 6). If an image signal has not been generated, the user's finger is diaphaned again with pulsating light as in Step 3.

Due to a fast picture formation process, the blood flow in the user's finger and the changes in the background lighting have almost no effect on the stability of the video signal. Thus, a clear and high quality dactyloscopical image is generated without smearing or blurring.

Figure 1:
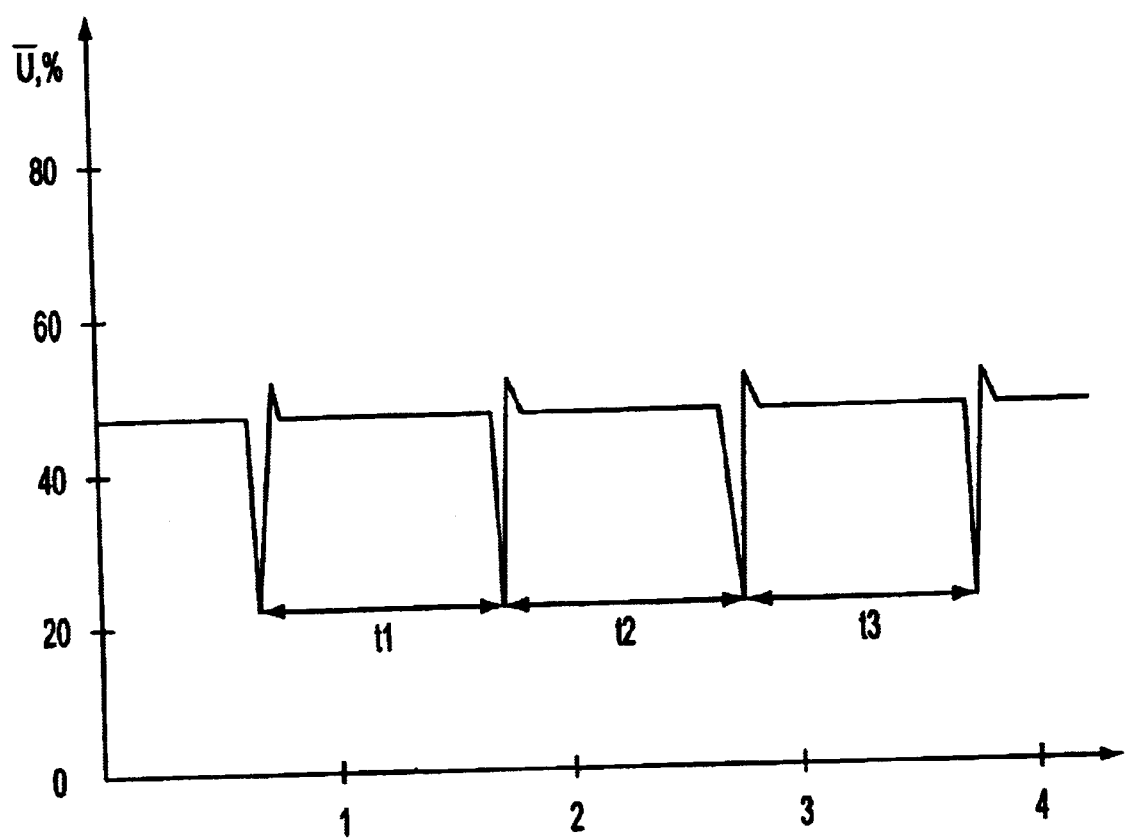
FIG. 1 is a graph showing the time dependency of finger transparency, utilized for user verification purposes.

In one preferable embodiment, the video camera 2 creates a number of consecutive dactyloscopical pictures. From each picture, or a part of it, a signal mean value is calculated. Time dependency of signal mean values is determined, similar to what is shown in FIG. 1. This time dependent signal mean value is equivalent to the time dependent changes in the transparency characteristic of the finger, which contains additional biometrics information about the user to be identified.

EXAMPLE

The period of pulse (pulse rate) may be calculated by mathematical processing of the time dependency data of the finger transparency. As shown in FIG. 1, the pulse rate corresponds to time intervals t1, t2, t3 between the minimal values of the graph. The resting pulse rate of men usually amounts to 0.8–1.2 pulses per second. Should only one of the registered time intervals ti (i =1,2,3, . . . ) expand beyond the limits of the specified interval, the user is not identified. Otherwise, the user is identified. If the individual pulse rate of a certain user has been measured earlier and saved in the computer, a comparison and identification is possible upon retrieval of this saved data about the pulse rate. The user will be identified if the variation is 10%. Therefore, the identification criterion here becomes a pulse rate of the user.

Additional biometrics information on pulse reduces the overall probability of an error in verification results, since it is capable of detecting whether a "live" finger has been placed on the entry surface 5 or a mere molded model of it. The available data on variations of finger transparency characteristic makes it possible to count the user's pulse rate and make further use of the corresponding graph for medical purposes. (This is analogous to an electrocardiogram).

Figure 3A:
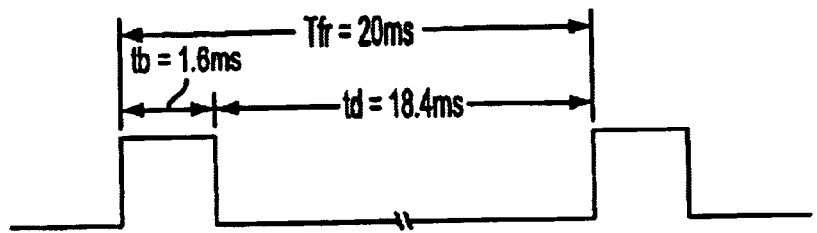
FIGS. 3A through 3E show time diagrams that illustrate the operational proceedings of the device.

The apparatus of the present invention operates as follows. While switching on the device, the picture sync signal generator of control module 4 creates picture sync signals at the output of video camera 2. The picture sync signals are shown in FIG. 3A. The period and duration of these signals correspond to those of common television standards—e. g. they may be signals of the CCIR-standard with a field-frequency of 50 cycles/second and 625 lines. The peak of the picture sync signal has a time duration (tb) of about 1.6 ms, and the signal period (Tfr) lasts about 20 ms. Of course, other television standards can also be used (for example, a field frequency of 60 cycles/sec and 525 lines).

Figure 3B:

The picture sync signals are led to the input of the pulse generator 7. Pulse generator 7 transforms the signals into shorter lasting signals, but the shorter signals have a sufficient amplitude to activate the pulsating light emitter 1. Thus, pulsating lighting emitter 1 radiates pulse lighting which is produced by the pulse generator 7. The output signals of pulse generator 7 are shown in FIG. 3B.

The user puts finger 6 onto the fiber optical input surface 5 of video camera 2. The finger 6 will be diaphaned by light pulses so that a dactyloscopical picture is formed on the surface of photosensitive unit 3.

Figure 3C:
Figure 3D:
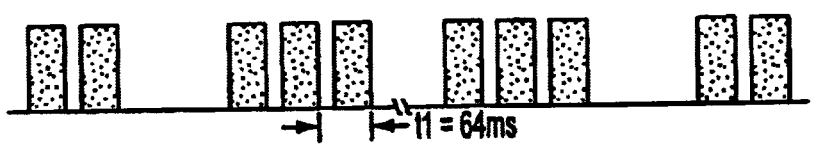

The control module 4 transmits controlling signals to the photosensitive unit 3 to permit formation of the charge picture equivalent of the corresponding dactyloscopical image, and to enable the read out process of this picture equivalent thereafter. FIGS. 3C and 3D show the controlling signals for Full Frame triphase CCD. The signal shown in FIG. 3C is attached to one phase of the photosensitive section of photosensitive unit 3, whereas the signal shown in FIG. 3D is transmitted to one of the phases of the output register of the photosensitive unit.

For the CCIR-standard (mentioned above), the period t1 for reading out a single line lasts 64 microseconds. The controlling signals for the other two phases of CCD are of analogous structure, yet the shift pulse of the one-phase is deferred to the shift pulse of the other.

The intervals tb represent the time periods during which the video camera 2 is in the picture formation mode. For example, during the time intervals tb, the dactyloscopical image is generated on the photosensitive surface 3 as a charge picture equivalent.

During the time interval td (characterized by the image advancing period), the video camera is in the reading out mode. The part of the control signal in the time interval td shown in FIGS. 3C and 3D coincides with the shift pulse.

Figure 3E:

Through these shift pulses, the process of reading out of the charge picture equivalent in a well-known manner is ensured. The signal shown in FIG. 3E corresponds with the read-out picture. The process of reading out a single line t1 takes 64 microseconds. This signal enters the control module 4. The control module 4 amplifies this picture signal and transforms it into a standard video signal.

The video signal is transmitted to the PC. There, it is digitized by the videoblaster and afterwards processed by the software applied. The program PCLOCK for instance realizes an algorithm as described below.

A sequence of pictures is analyzed. The first picture assists to gain dactyloscopical data. In other words, the coordinates of distinguishing dactyloscopical marks are determined in relation to the center of the fingerprint type. After that, these data are compared with the file(s) of dactyloscopical data of all authorized users earlier saved in the file (archive) of the PCLOCK program.

The other pictures determine the frequency of the user's pulse, which is measured by the mean value of a video signal of a preset part of each picture of the sequence and an analysis of the mean values of time dependency (the time dependency is shown in FIG. 1).

The pulse frequency data may also be compared with the pulse frequencies of authorized users saved in the file earlier. In case the obtained dactyloscopical information and pulse rate match the computer data on the user, identification is successfully performed and the user gets an access to the system. Otherwise, the PCLOCK system just blocks the computer. Verification results appear on the computer screen. A high quality image of fingerprint pattern used along with the biometrics pulse data allows for significant reduction of error probability. A simplified variant of identity verification is solely to check if the dactyloscopical picture is identical with the dactyloscopical data saved in the file. The registration of pulse frequency is utilized only to make sure that the finger checked really is alive, without comparing it with the individual mean pulse frequency of the user.

A simplified version of this device verifies a user if offered dactyloscopical information matches the retrieved computer information of this user, upon condition that the system detects a pulse rate in the finger offered for verification. It must be a "live" finger; no other model or a fingerprint may pass for a finger. This version of the device works with only dactyloscopical data and does not measure or even check for a pulse rate. In this case, the dactyloscopical picture in processing module 8 is obtainable from a single image. Therefore, there is no need to analyze a number of consecutive images.

This device may also store the obtained information about the user in the computer memory. It may be both dactyloscopical and pulse rate data, saved for verification purposes at a later time.

COMPARATIVE TEST RESULTS

The inventors have performed a test to compare the function of three dactyloscopical devices utilizing different types of light. The results of the comparison are shown below.

Type 1: reflected light
Type 2: diaphaning constant light (see Russian patent No. 2031625)
Type 3: diaphaning pulse light according to this invention (without including determination of pulse data)

The computer software for identity-verification purposes was the same in all three cases. Its archive contained one thousand (1000) fingerprints. The test results are presented in the following table (the identification inaccuracy is set as a ratio to its determined minimal value.)

| Type of device | 1<br>Reflected<br>Light | 2<br>Dianphaning<br>constant | 3<br>Diaphaning<br>pulse |
|---|---|---|---|
| Relative inaccuracy of identification | 10 | 9 | 1 |

These results clearly show the superiority of the device of the present invention as a matter of principle in comparison to the other devices, even though pulse frequency data were not analyzed.

Various modifications and adaptations may be made to the present invention by those skilled in the art that fall within the scope and spirit of the appended claims. For example, numerous variations with respect to the cover, the duration of the pulsating light or the number of images exist which are nevertheless within the spirit and scope of the present invention. The identification system may be used for a wide variety of purposes, for example, it may be installed as an apartment lock, an identifying module for a PC or special program part of it, and/or may control access to computer networks or firearm safety locks. The system may be used as part of a medical device for diagnostic purposes, as well as a safety guarantee for a system of clearing settlements. The simplicity of its technical realization and the wide range of applicability underscores the significance of this novel invention.

We claim:

1. A method for user identification by penetrating light comprising the steps of:
   (a) placing a user's finger on an entry surface of a video camera;
   (b) diaphaning the user's finger with penetrating and pulsating light;
   (c) generating an image signal of a portion of the user's finger placed on said entry surface of the video camera; and
   (d) processing an the generated image signal-transmitted from the video camera;
       identifying biometric information about the user's pulse by receiving more than one successive frame of the image signal from the video camera;
       determining an average value of the image signal in at least a part of every frame; and
       using a time function of the determined average signal as a user identification criterion, wherein:
       the user's finger is illuminated by said penetrating and pulsating light as the video camera accumulates the an image of a fingerprint of the user's finger in a picture formation mode.

2. The method of claim 1, further comprising the steps of:
   opening an access to the entry surface of the video camera prior to placing the user's finger thereon; and
   closing the access to the input entry surface of the video camera subsequent to generating the image signal.

3. The method according to claim 1, further comprising the steps of:
   activating a device to expose the entry surface to light during a working mode; and
   securing said device to block light from the entry surface after generating the image signal.

4. The method according to claim 1, wherein said entry surface is a fiber optic surface.

5. An apparatus for user identification, comprising:
   a video camera comprising a photosensitive charge transfer device, a photosensitive device control module, and an input surface;
   a light source for emitting light for penetrating a portion of a user's finger;
   a processing module for receiving an output image of the user's finger from the video camera;
   a cover movable from a covering position, for blocking access to said input surface when the photosensitive charge transfer device is in a non-working mode, to a non-covering position, for allowing access to said input surface when the photosensitive charge transfer device is in a working mode, wherein:
      said light source comprises a pulsating light emitter which is synchronized with said photosensitive device control module for pulsating switching of said pulsating light emitter while said video camera is in an image accumulation mode,
      said pulsating light emitter of said light source comprises a plurality of light emitting diodes, and
      a side of said cover has a mirrored surface and said light emitting diodes of said light source are located in substantially a same plane with the photosensitive charge transfer device.

6. The apparatus according claim 5 wherein the photosensitive charge transfer device comprises a CMOS image sensor with a full frame electronic shutter.

7. The apparatus according to claim 5 wherein said a plurality of pulsating light emitters are located around a perimeter of said input surface.

8. The apparatus according to claim 5, further comprising: a pulse controlling light driver connected between the photosensitive device control module and the pulsating light emitter.

9. The apparatus according to claim 6, further comprising: a pulse controlling light driver connected between said photosensitive device control module and said pulsating light emitter.

10. The apparatus according to claim 5, wherein said cover allows access to said input surface by having a plurality of opening positions that range from 10 to 90 degrees from said input surface.

11. The apparatus according to claim 5, wherein said light emitter emits light which impinges on said input surface substantially perpendicular to said input surface.

12. The apparatus according to claim 5, wherein where the wavelength of the pulsating light emitted by said light emitting diodes is approximately 800 nm.

13. The apparatus according to claim 5, wherein said mirrored surface evenly reflects the light from said light emitter to the finger of the user.

14. The apparatus according to claim 5, wherein the cover further comprises securing means for securing said cover to block said input surface, and for unsecuring said cover to permit access to said input surface.

15. The apparatus according to claim 14, wherein said securing means comprises a biasing means.

16. The apparatus according to claim 14, wherein said securing means comprises a latch.

17. The apparatus according to claim 5, wherein said cover comprises a non-transparent material to block said input surface from external light.

18. The apparatus according to claim 5, wherein said input surface is a fiber optic surface.

19. The apparatus according to claim 5, said photosensitive charge transfer device is one of a Full Frame CCD and a CMOS image sensor.

20. An apparatus for user identification, comprising:
   a video camera comprising a photosensitive charge transfer device, a photosensitive device control module and an input surface;
   a light source for emitting light for penetrating a portion of a user's finger;
   a processing module for receiving an output image of the user's finger from the video camera; and
   a cover movable from a covering position, for blocking access to said input surface when the photosensitive charge transfer device is in a non-working mode, to a non-covering position, for allowing access to said input surface when the photosensitive charge transfer device is in a working mode, wherein:
   said light source comprises a pulsating light emitter which is synchronized with said photosensitive device control module for pulsating switching of said pulsating light emitter while said video camera is in an image accumulation mode, and
   said cover further comprises a narrow bandpass optic filter disposed between said photosensitive charge transfer device and a fiber optic plate, permitting passage of wavelengths from said light source.

* * * * *